(12) United States Patent
Yang

(10) Patent No.: US 11,704,811 B2
(45) Date of Patent: Jul. 18, 2023

(54) METHOD AND APPARATUS FOR GENERATING BACKGROUND-FREE IMAGE, DEVICE, AND MEDIUM

(71) Applicant: Beijing Baidu Netcom Science and Technology Co., Ltd., Beijing (CN)

(72) Inventor: Haiyan Yang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 181 days.

(21) Appl. No.: 17/212,978

(22) Filed: Mar. 25, 2021

(65) Prior Publication Data

US 2021/0217180 A1 Jul. 15, 2021

(30) Foreign Application Priority Data

May 22, 2020 (CN) .......................... 202010443553.X

(51) Int. Cl.
*G06T 7/00* (2017.01)
*G06T 7/194* (2017.01)
(Continued)

(52) U.S. Cl.
CPC ................ *G06T 7/194* (2017.01); *G06T 5/50* (2013.01); *G06T 7/254* (2017.01); *G06T 2207/20112* (2013.01)

(58) Field of Classification Search
CPC ............. G06T 7/11; G06T 2207/20081; G06T 2207/20084; G06T 7/194;
(Continued)

(56) References Cited

U.S. PATENT DOCUMENTS 9,965,865 B1 5/2018 Agrawal
2011/0206282 A1* 8/2011 Aisaka .................... G06T 11/60
382/195
(Continued)

FOREIGN PATENT DOCUMENTS

CN 109146892 A 1/2019
CN 109727264 A 5/2019
(Continued)

OTHER PUBLICATIONS

V. Gupta and S. Raman, "Automatic trimap generation for image matting," 2016 International Conference on Signal and Information Processing (IConSIP), 2016, pp. 1-5, doi: 10.1109/ICONSIP.2016.7857477. (Year: 2016).*
(Continued)

*Primary Examiner* — Li Liu
(74) *Attorney, Agent, or Firm* — Nixon Peabody LLP

(57) ABSTRACT

Embodiments of the present disclosure provide a method and apparatus for generating a background-free image, a device, and a medium. The method may include: determining an image proportion of a target subject in an original image; clipping, in response to the image proportion being less than a preset threshold, a subject region image corresponding to the target subject from the original image; determining a corresponding subject region mask based on the subject region image; and synthesizing the subject region mask and the subject region image to generate a background-free image corresponding to the original image.

18 Claims, 5 Drawing Sheets

Determining an image proportion of a target subject in an original image ~ S110

Clipping, in response to the image proportion being less than a preset threshold, a subject region image corresponding to the target subject from the original image ~ S120

Determining a corresponding subject region mask based on the subject region image ~ S130

Synthesizing the subject region mask and the subject region image to generate a background-free image corresponding to the original image ~ S140

(51) Int. Cl.
*G06T 7/254* (2017.01)
*G06T 5/50* (2006.01)
(58) Field of Classification Search
CPC .......... G06T 2207/20112; G06T 9/002; G06V 10/82; G06V 2201/07; G06V 10/774; G06K 9/6256
See application file for complete search history.

(56) References Cited

U.S. PATENT DOCUMENTS

| | | | |
|---|---|---|---|
| 2017/0039723 A1* | 2/2017 | Price | G06T 7/11 |
| 2019/0311202 A1* | 10/2019 | Lee | G06T 9/002 |
| 2021/0142455 A1 | 5/2021 | Hsiao et al. | |
| 2021/0166400 A1* | 6/2021 | Goel | G06N 3/08 |

FOREIGN PATENT DOCUMENTS

| | | |
|---|---|---|
| GN | 110148102 A | 8/2019 |
| GN | 110751668 A | 2/2020 |
| NO | 2020025000 A1 | 2/2020 |

OTHER PUBLICATIONS

Y. Zheng and C. Kambhamettu, "Learning based digital matting," 2009 IEEE 12th International Conference on Computer Vision, 2009, pp. 889-896, doi: 10.1109/ICCV.2009.5459326. (Year: 2009).*

English translation of CN109727264.*

Extended European Search Report for Application No. 21171537.0, dated Oct. 22, 2021 (9 pages).

Hsieh, C.-L. et al.; "Automatic trimap generation for digital image matting"; 2013 Asia-Pacific Signal and Information Processing Association Annual Summit and Conference (APSIPA), Oct. 29, 2013, pages 1-5; XP032549799; DOI: 10.1109/APSIPA.2013.6694178 (5 pages).

Jaewhan, K. et al., "Unsupervised Salient Object Matting"; ICIAP: International Conference on Image Analysis and Processing, 17 International Conference; Naples, Italy, Sep. 9-13, 2013, Nov. 6, 2015; XP047329039; pp. 752-7; ISBN: 978-3-642-17318-9 (12 pages).

\* cited by examiner

METHOD AND APPARATUS FOR GENERATING BACKGROUND-FREE IMAGE, DEVICE, AND MEDIUM

CROSS-REFERENCE TO RELATED APPLICATIONS

This application claims priority to Chinese Patent Application No. 202010443553.X, filed on May 22, 2020, titled "Method and apparatus for generating background-free image, device, and medium," which is hereby incorporated by reference in its entirety.

TECHNICAL FIELD

Embodiments of the present disclosure relate to the field of computer technology, and specifically to an image processing technology.

BACKGROUND

An existing image processing technology will relate to a matting technology, i.e., keeping a subject part as a foreground in an image, whilst removing a background part. In a process of image processing, it will often be necessary to mat other original background parts except for a subject in the image, to add a desired background to the subject in the image.

SUMMARY

Embodiments of the present disclosure disclose a method and apparatus for generating a background-free image, a device, and a medium.

According to a first aspect, a method for generating a background-free image is provided. The method includes: determining an image proportion of a target subject in an original image; clipping, in response to the image proportion being less than a preset threshold, a subject region image corresponding to the target subject from the original image; determining a corresponding subject region mask based on the subject region image; and synthesizing the subject region mask and the subject region image to generate a background-free image corresponding to the original image.

According to a second aspect, an apparatus for generating a background-free image is provided. The apparatus includes: a proportion determining module configured to determine an image proportion of a target subject in an original image; an image clipping module configured to clip, in response to the image proportion being less than a preset threshold, a subject region image corresponding to the target subject from the original image; a mask determining module configured to determine a corresponding subject region mask based on the subject region image; and an image generating module configured to synthesize the subject region mask and the subject region image to generate a background-free image corresponding to the original image.

According to a third aspect, an electronic device is provided. The electronic device includes at least one processor; and a memory communicatively connected to the at least one processor. The memory stores instructions executable by the at least one processor, and the instructions when executed by the at least one processor, cause the at least one processor to execute the method according to any implementation of the embodiments of the present disclosure.

According to a fourth aspect, a non-transitory computer-readable storage medium storing computer instructions is provided. The computer instructions are used to cause a computer to execute the method according to any implementation of the embodiments of the present disclosure.

It should be understood that contents described in the SUMMARY are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for better understanding of the present solution, and do not impose a limitation on the present disclosure.

DETAILED DESCRIPTION OF EMBODIMENTS

Example embodiments of the present disclosure are described below with reference to the accompanying drawings, including various details of embodiments of the present disclosure to contribute to understanding, which should be considered merely as examples. Therefore, those of ordinary skills in the art should realize that various alterations and modifications can be made to the embodiments described here without departing from the scope and spirit of the present disclosure. Similarly, for clearness and conciseness, descriptions of well-known functions and structures are omitted in the following description.

According to an embodiment of the present disclosure, a method for generating a background-free image is provided.

Figure 1:
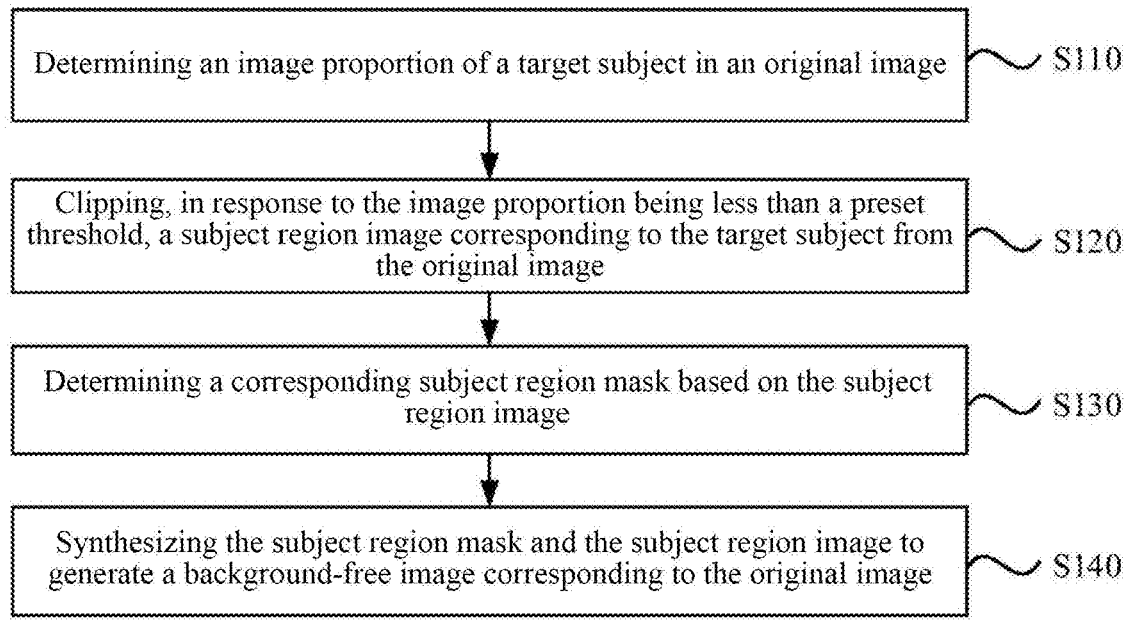
FIG. 1 is a flowchart of a method for generating a background-free image according to an embodiment of the present disclosure.

FIG. 1 is a flowchart of a method for generating a background-free image according to an embodiment of the present disclosure. The present embodiment is adaptable to a circumstance of background matting of an image. The method may be executed by an apparatus for generating a background-free image. The apparatus may be implemented by software and/or hardware, and may be generally integrated in an electronic device, such as a computer, or a phone.

Specifically, referring to FIG. 1, the method specifically includes the following steps.

S110: determining an image proportion of a target subject in an original image.

In the present embodiment, the original image may include a foreground and a background, where the foreground may include at least one target subject, and the background may be a part except for the foreground in the original image. Specifically, the target subject may be a salient part in the original image, such as a person, an animal, or a specified object, which is not limited here. Further, the image proportion of the target subject in the original image may be a ratio of an area of an image region corresponding to all target subjects in the original image to an area of the whole original image.

An object of the determining an image proportion of a target subject in an original image is to determine whether the image proportion of the target subject in the original image is very low, in order to mat original images with different subject proportions by different approaches in subsequent steps.

S120: clipping, in response to the image proportion being less than a preset threshold, a subject region image corresponding to the target subject from the original image.

In an implementation, when the image proportion of the target subject in the original image is less than the preset threshold, it means that the image proportion of the target subject in the original image is very low, and it is necessary to separately mat the target subject in the original image, to improve the matting precision. The preset threshold may be set based on actual requirements, which is not limited here.

For example, the subject region image corresponding to the target subject may be clipped from the original image, to further mat the subject region image. The clipped subject region image may be a region image including the target subject and a part of the background in the original image, and an image proportion of the target subject in the subject region image is higher than the image proportion of the target subject in the original image. A clipping approach of the subject region image includes, but is not limited to, expanding an original image region corresponding to the target subject to a background part outside the image region corresponding to the target subject by a preset multiple, and then clipping the original image, and the like.

It should be noted that the matting process in the present embodiment is for the subject region image, and more details during the matting can be considered, thereby improving the matting precision of an image with a low subject proportion.

S130: determining a corresponding subject region mask based on the subject region image.

A mask may be an external part of a selection box (a selected region is inside the selection box). That is, opposite to the selected region, the external part of the selection box may be referred to as a mask. A conventional selected region indicates an operation trend, i.e., processing the selected region; and in contrast, the mask protects the selected region, to prevent the selected region from operation, and process non-masked places. In conclusion, the mask is a part outside the selected region, and is intended to protect a content of the selected region. A place masked by the mask is not affected during image processing, is required to be kept integrally, and therefore is required to be displayed on an image layer. Understood from this perspective, black (i.e., the eternal part of the selected region) of the mask is completely transparent, white (i.e., the selected region) of the mask is non-transparent, and gray of the mask is situated therebetween (a part of the selected region, i.e., semitransparent).

In the present embodiment, the subject region mask may be matting an image corresponding to the external part of the selected region (i.e., the background part) with the target subject as the selected region, and with the background part as the external part of the selected region. Specifically, the subject region mask corresponding to the subject region image may be determined by various approaches, such as acquiring the mask by matting based on a tripartite image, and/or acquiring the mask by saliency detection.

Alternatively, the determining a corresponding subject region mask based on the subject region image includes: performing saliency detection on the subject region image to obtain an initial mask of the subject region image; binarizing the initial mask of the subject region image to obtain a binarized mask of the subject region image; and generating a tripartite image based on the binarized mask of the subject region image, and matting the subject region image using a preset matting algorithm based on the tripartite image, to obtain the subject region mask.

An alternative implementation of the present embodiment is acquiring the mask by combining saliency detection with the matting algorithm based on the tripartite image. The benefit of such setting is that the matting precision may be further improved. The saliency detection, also known as visual saliency detection, means to simulate human vision characteristics by an intelligent algorithm, to extract a salient region (i.e., a region of interest for human) in an image.

For example, first, saliency detection on the subject region image may be performed to obtain the initial mask, the initial mask may include a white part (regarded as the target subject region), a black part (regarded as a background region), and a gray part with a plurality of pixel values (uncertain region); then the initial mask is binarized to obtain the binarized mask, and the binarized mask only includes a white part and a black part; and finally, the tripartite image is generated based on the binarized mask of the subject region image, where the tripartite image may include a white part (regarded as the target subject region), a black part (regarded as the background region), and a gray part (uncertain region) with a single pixel value at a junction of the target subject region and the background region, and then the subject region image is matted based on the tripartite image, to obtain the subject region mask. An employed preset matting algorithm may be at least one of knn matting, closed form matting, deep matting, large kernel matting, guided contextual attention matting, or the like.

S140: synthesizing the subject region mask and the subject region image to generate a background-free image corresponding to the original image.

In the present embodiment, after acquiring the subject region mask corresponding to the subject region image, the subject region mask and the subject region image may be synthesized, the target subject in the subject region image may be protected using a white part in the subject region mask, and a background in the subject region image may be matted using a black part in the subject region mask, to generate the background-free image corresponding to the original image. Alternatively, after the generating a background-free image corresponding to the original image, the method may further include: enlarging the background-free image based on a preset proportion, and restoring the background-free image to a corresponding position in a preset background image, to generate a subject image with a preset background. The benefit of enlarging the background-free subject image, and restoring the background-free subject image to a position corresponding to the target subject in the original image is that the target subject in an image with a low subject proportion may be enlarged in a new preset background image, to reach an appropriate proportion, and facilitate other processing on the image.

According to the technical solution of the present embodiment, when determining an image proportion of a target subject in an original image being less than a preset threshold, a subject region image corresponding to the target subject is clipped from the original image, then a corresponding subject region mask is determined based on the subject region image, and then the subject region mask and the subject region image are synthesized to generate a background-free image corresponding to the original image. The advantage of clipping an image with a low subject proportion and separately matting the image is utilized to solve the problem of existing technologies that when the subject proportion in the original image is low, the matting effect presented by processing the background-free image is undesired and the matting precision is low, and to guarantee high matting precision even for the image with a low subject proportion.

According to an embodiment of the present disclosure, a method for generating a background-free image is further provided.

Figure 2:
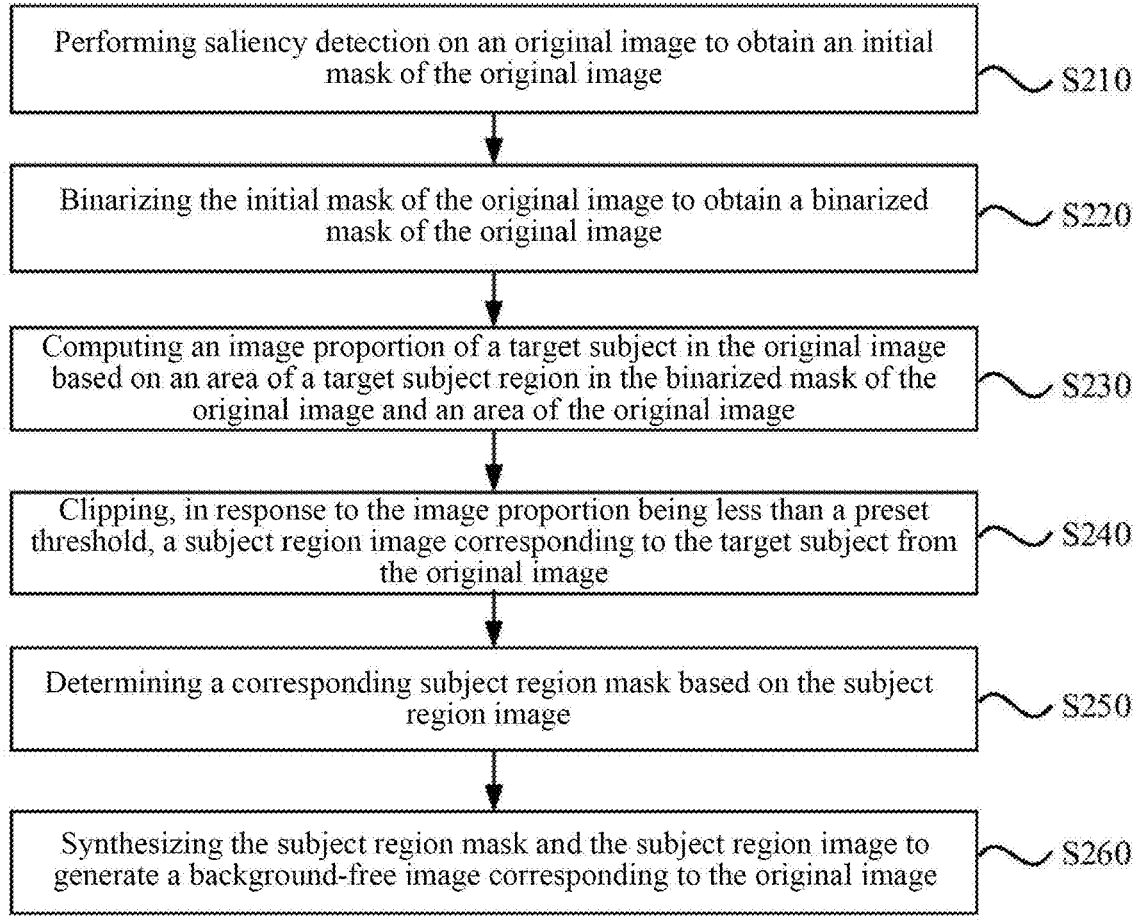
FIG. 2 is a flowchart of another method for generating a background-free image according to an embodiment of the present disclosure.

FIG. 2 is a flowchart of another method for generating a background-free image according to an embodiment of the present disclosure. The present embodiment details any one of the above embodiments, and details the determining an image proportion of a target subject in an original image including: performing saliency detection on the original image to obtain an initial mask of the original image; binarizing the initial mask of the original image to obtain a binarized mask of the original image; and computing the image proportion of the target subject in the original image based on an area of a target subject region in the binarized mask of the original image and an area of the original image.

Specifically, referring to FIG. 2, the method specifically includes the following steps.

S210: performing saliency detection on an original image to obtain an initial mask of the original image.

Based on the above embodiments, in a process of computing an image proportion of a target subject in the original image in the present embodiment, first, preprocessing and saliency detection on the original image may be performed, and then the image proportion of the target subject may be computed based on an obtained mask image.

In an alternative implementation, saliency detection on the original image may be performed in the same way as saliency detection on the subject region image in the above embodiments, and then the initial mask of the original image may be obtained. The initial mask may also include a white part (regarded as a target subject region), a gray part (uncertain region), and a black part (regarded as a background region).

Based on the above embodiments, alternatively, the performing saliency detection on an image to obtain an initial mask of the image includes: inputting the image into a trained saliency detecting model to output the initial mask of the image.

For example, for the original image and/or the subject region image, the corresponding initial mask may be acquired by saliency detection based on deep learning. The employed deep neural network includes, but is not limited to, a CNN (Convolutional Neural Network), an FCN (Fully Convolutional Network), etc., and preferably a CPD (Cascaded Partial Decoder).

The benefit of using the saliency detecting model for detection is that any kind of target subject in the image may be recognized without manually annotating a foreground or background in the image.

In an alternative implementation, a preset neural network may be trained using a training sample to continuously optimize network parameters, and the trained saliency detecting model may be obtained when the parameters are optimized. The training sample used when training the preset neural network may be, e.g., a training data set DUTS-TR. It should be noted that the DUTS-TR data set includes a plurality of original image samples and corresponding masks thereof. Of course, other training data sets may also be used, which is not limited here.

Alternatively, before inputting an image into a trained saliency detecting model, the method further includes: acquiring a plurality of background-free subject images and a plurality of preset background images; synthesizing any one of the background-free subject images and any one of the preset background images to generate a training sample; and training the preset neural network using the training sample to obtain the trained saliency detecting model.

In an alternative implementation, in addition to using the DUTS-TR data set as the training sample, a plurality of training samples composed of transparent material images and a plurality of backgrounds may also be used as an expanded data set to train the preset neural network. An approach of the acquiring a plurality of background-free subject images includes, but is not limited to, searching from a network search engine. In addition, the preset background image may be a background image that has a similar background to the original image. For example, if the original image is an image of different target subjects with a desktop as a background, then the preset background image may be a similar or identical desktop image. An approach of the acquiring a plurality of preset background images includes, but is not limited to, collecting images under a background identical to an environment where the original image is acquired.

The benefit of training the preset neural network by using an image formed by any combination of a plurality of background-free subject images and a plurality of preset background images as the training sample is that the saliency detecting model can be made to have a better matting effect for an original image collected under a similar or identical background and improve the matting precision.

Alternatively, before the performing saliency detection on an original image, the method further includes: enhancing and sharpening the original image.

For example, before matting, the original image may be first preprocessed, where the preprocessing approach includes, but is not limited to, enhancing, sharpening, and the like. Specifically, the original image may be enhanced using a preset enhancement algorithm, and an enhancing result image may be sharpened using a preset sharpening algorithm. The preset enhancement algorithm may be, e.g., histogram equalization and gamma conversion, and the preset sharpening algorithm may be, e.g., unsharp mask.

The benefit of enhancing and sharpening the original image is that the target subject in the original image can be more obvious, and has stronger contrast with the background, thereby improving the saliency detection accuracy.

S220: binarizing the initial mask of the original image to obtain a binarized mask of the original image.

In the present embodiment, the process of binarizing the initial mask may be converting a mask image that includes a black background part, a white subject part and a gray uncertain part in the initial mask into a mask image that only includes a black background part and a white subject part. The employed binarizing algorithm includes, but is not limited to, OTSU (maximum between-class variance method), etc.

S230: computing an image proportion of a target subject in the original image based on an area of a target subject region in the binarized mask of the original image and an area of the original image.

For example, an area size of the target subject may be computed for the binarized mask of the original image, and compared with a size of the original image, to further compute the image proportion of the target subject in the original image. Specifically, a ratio of an area of the target subject to an area of the original image may be used as the image proportion of the target subject in the original image. In a practical example, a ratio of the number of pixels of a white subject part in the binarized mask to a total number of all pixels included in the binarized mask may be computed, to obtain the ratio of the area of the target subject to the area of the original image, i.e., the image proportion of the target subject in the original image.

Alternatively, after computing the image proportion of the target subject in the original image based on the area of the target subject region in the binarized mask of the original image and the area of the original image, the method further includes: generating a tripartite image based on the binarized mask of the original image in response to the image proportion being more than or equal to the preset threshold, and matting the original image using a preset matting algorithm based on the tripartite image, to obtain a final mask of the original image.

In an alternative implementation, when the image proportion of the target subject in the original image is more than or equal to the preset threshold, i.e., the target subject in the original image is a large object, the original image may be matted directly by combining saliency detection with the matting algorithm based on the tripartite image, without the need of clipping the subject region image. Specifically, because saliency detection on the original image is performed before computing the image proportion of the target subject, when determining the target subject in the original image being a large object, the tripartite image may be generated directly based on the binarized mask of the original image, and the original image is matted with reference to the matting algorithm of the tripartite image, to obtain the final mask of the original image. For description of the tripartite image and the preset matting algorithm, reference may be made to the matting the subject region image based on the tripartite image in the above embodiments, which will not be repeated herein.

The benefit of matting original images with different subject proportions by different approaches is that high matting precisions can be kept for original images of different subject sizes.

S240: clipping, in response to the image proportion being less than a preset threshold, a subject region image corresponding to the target subject from the original image.

Alternatively, the clipping a subject region image corresponding to the target subject from the original image includes: determining a smallest bounding matrix of the target subject based on the binarized mask of the original image; enlarging an image region corresponding to the smallest bounding matrix to a preset multiple, for use as an clipped image region; and clipping a corresponding image block from the original image based on a position of the clipped image region, for use as the subject region image.

The smallest bounding matrix may be a matrix used for describing a smallest rectangle bounded by the target subject in the original image. In order to achieve an appropriate image proportion of the target subject, the image region corresponding to the smallest bounding matrix may be enlarged to the preset multiple, e.g., to 1.5 times as much as the original one, the enlarged image region is used as the clipped image region, and then the image block is clipped at the position of the corresponding region in the original image, for use as a ROI (Region of Interest) of the original image, i.e., the subject region image.

The benefit of enlarging the image region corresponding to the smallest bounding matrix of the target subject to the preset multiple, for use as the clipped image region, and clipping a corresponding subject part of the original image based on the clipped image region is that corresponding matting after the target subject reaches an appropriate image proportion can improve the matting precision of an image with a low subject proportion.

S250: determining a corresponding subject region mask based on the subject region image.

S260: synthesizing the subject region mask and the subject region image to generate a background-free image corresponding to the original image.

According to the technical solution of the present embodiment, saliency detection on an original image is performed to obtain an initial mask of the original image, then the initial mask is binarized to obtain a binarized mask of the original image, then an image proportion of a target subject in the original image is computed based on an area of a target subject region in the binarized mask and an area of the original image, a corresponding matting process is carried out when the image proportion is less than a preset threshold, the image proportion of the target subject is computed using the binarized mask obtained by saliency detection and binarizing, thereby computing the image proportion of the target subject more conveniently and simply, whilst improving the accuracy of the computing result.

Based on the above embodiments, alternatively, the generating a tripartite image based on the binarized mask includes: expanding and corroding the binarized mask to obtain an expanded mask and a corroded mask; setting a pixel value of an image region corresponding to a position of the target subject region within the expanded mask in the binarized mask, for use as a first pixel value; setting a pixel value of an image region corresponding to a position of the target subject region within the corroded mask in the binarized mask, for use as a second pixel value; and setting a pixel value of other image regions in the binarized mask for use as a third pixel value, to obtain the tripartite image.

The expanding means to integrate the target subject into the background and expand the target subject outwards. For example, the expanding the binarized mask may be expanding the white subject part within the binarized mask outwards, i.e., broadening the target subject; opposite to the expanding, the corroding means to remove the interconnecting boundary to contract the boundary inwards. For example, corroding the binarized mask may be contracting the white subject part within the binarized mask inwards, i.e., thinning the target subject.

For example, a specific approach of generating the tripartite image, e.g., may be: expanding and corroding the target subject in the binarized mask respectively by image expanding and image corroding to a certain range, first setting the pixel value of the image region corresponding to the position of the target subject region in the expanding result (i.e., a pixel value of a union set of the expanding result and the corroding result), for use as the first pixel value, then setting the pixel value of the image region corresponding to the position of the target subject region in the corroding result (i.e., a pixel value of an intersection set of the expanding result and the corroding result), for use as the second pixel value, and finally setting a pixel value outside the two image regions for use as the third pixel value, to obtain the tripartite image.

The first pixel value, the second pixel value, and the third pixel value are different. For example, the first pixel value may be 128, the second pixel value may be 255, and the third pixel value may be 0.

The benefit of matting the original image or the subject region image based on the preset matting algorithm with reference to the tripartite image obtained from the expanding and corroding is that the accuracy of identification of a boundary between the target subject and the background can be improved, and the image matting precision can be further improved.

Alternatively, after matting the tripartite image using the preset matting algorithm, the method further includes: performing edge smoothing on a matted mask using a preset filtering approach.

The preset filtering approach includes, but is not limited to, Gaussian filtering, median filtering, and the like. The benefit of the performing edge smoothing on a matted mask is that a jagged edge of the target subject in the mask can be weakened, and the mask precision can be improved to obtain a mask with a more precise edge structure, thereby improving the image matting effect.

According to an embodiment of the present disclosure, a method for generating a background-free image is further provided.

Figure 3A:
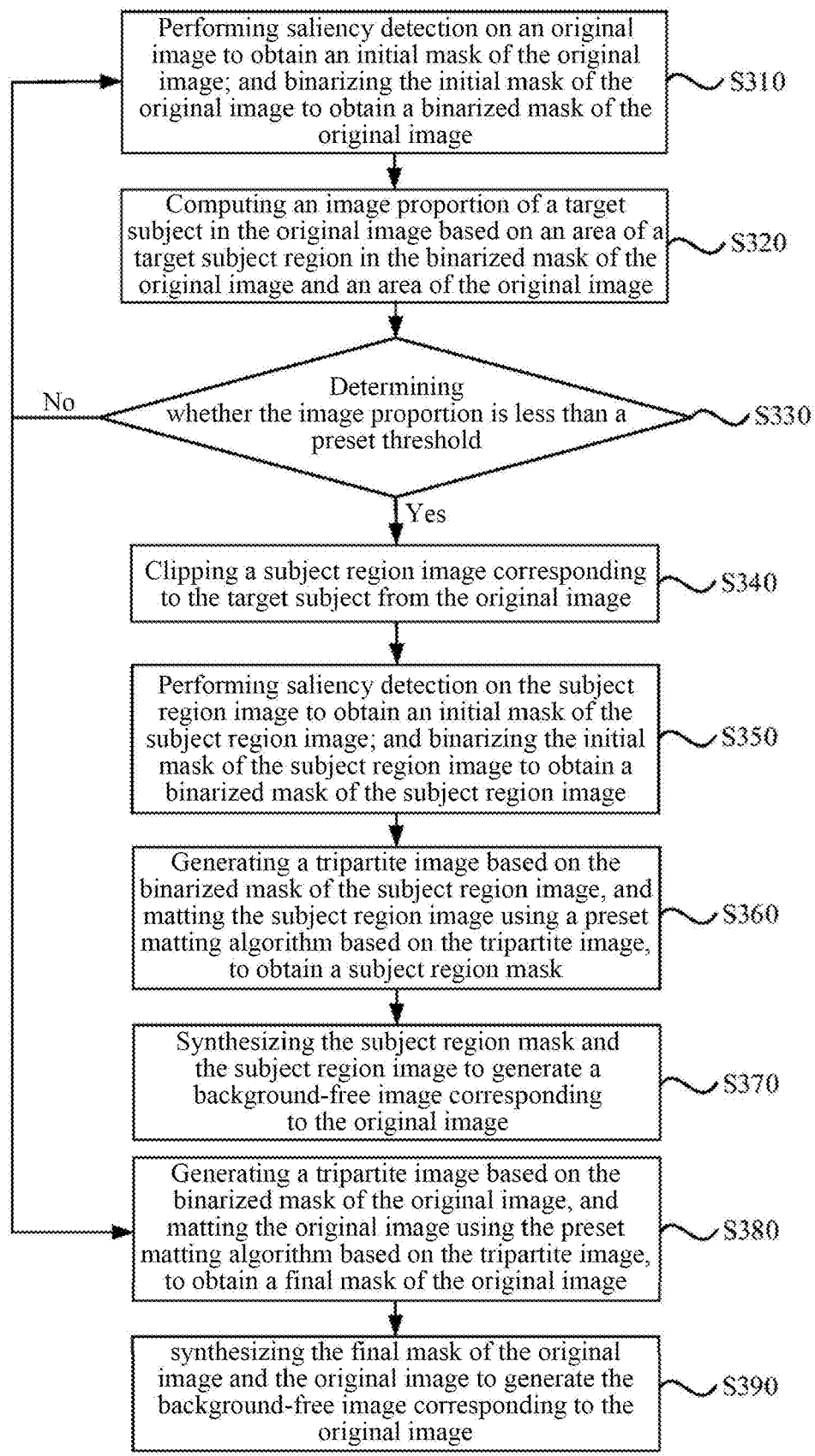
FIG. 3A is a flowchart of still another method for generating a background-free image according to an embodiment of the present disclosure.

FIG. 3A is a flowchart of still another method for generating a background-free image according to an embodiment of the present disclosure. The present embodiment details any one of the above embodiments, and provides a detailed alternative implementation.

Specifically, referring to FIG. 3A, the method specifically includes the following steps.

S310: performing saliency detection on an original image to obtain an initial mask of the original image; and binarizing the initial mask of the original image to obtain a binarized mask of the original image.

S320: computing an image proportion of a target subject in the original image based on an area of a target subject region in the binarized mask of the original image and an area of the original image.

S330: determining whether the image proportion is less than a preset threshold, executing step S340 in response to that the image proportion is less than the preset threshold; and executing step S380 in response to that the image proportion is more than or equal to the preset threshold.

S340: clipping a subject region image corresponding to the target subject from the original image.

S350: performing saliency detection on the subject region image to obtain an initial mask of the subject region image; and binarizing the initial mask of the subject region image to obtain a binarized mask of the subject region image.

S360: generating a tripartite image based on the binarized mask of the subject region image, and matting the subject region image using a preset matting algorithm based on the tripartite image, to obtain a subject region mask.

S370: synthesizing the subject region mask and the subject region image to generate a background-free image corresponding to the original image.

S380: generating a tripartite image based on the binarized mask of the original image, and matting the original image using the preset matting algorithm based on the tripartite image, to obtain a final mask of the original image.

S390: synthesizing the final mask of the original image and the original image to generate the background-free image corresponding to the original image.

Figure 3B:
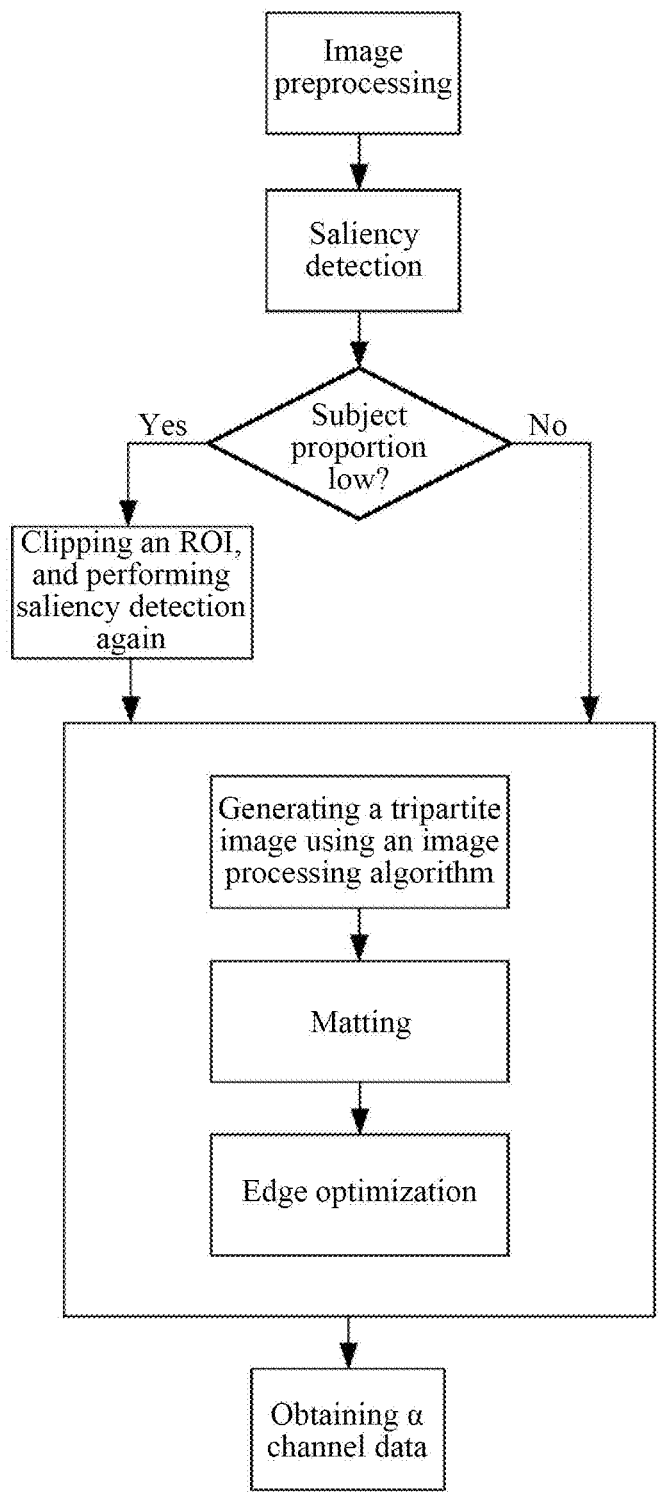
FIG. 3B is a flowchart of an alternative matting approach according to an embodiment of the present disclosure.

In a practical example, the matting may be performed by an approach as shown in FIG. 3B. The matting includes: first performing image preprocessing on an original image, e.g., enhancing and sharpening; performing saliency detection on the preprocessed original image; binarizing a detected mask to compute a subject proportion of a target subject, and determining whether the subject proportion is low; clipping a ROI in the original image in response to that the subject proportion is low, and performing saliency detection on the clipped subject image again, generating a tripartite image using an image processing algorithm, then matting using a matting method, and performing edge optimization to finally generate a channel data; otherwise, generating a tripartite image directly using the image processing algorithm, then matting using the matting method, and performing edge optimization to finally generate a channel data.

Figure 3C:
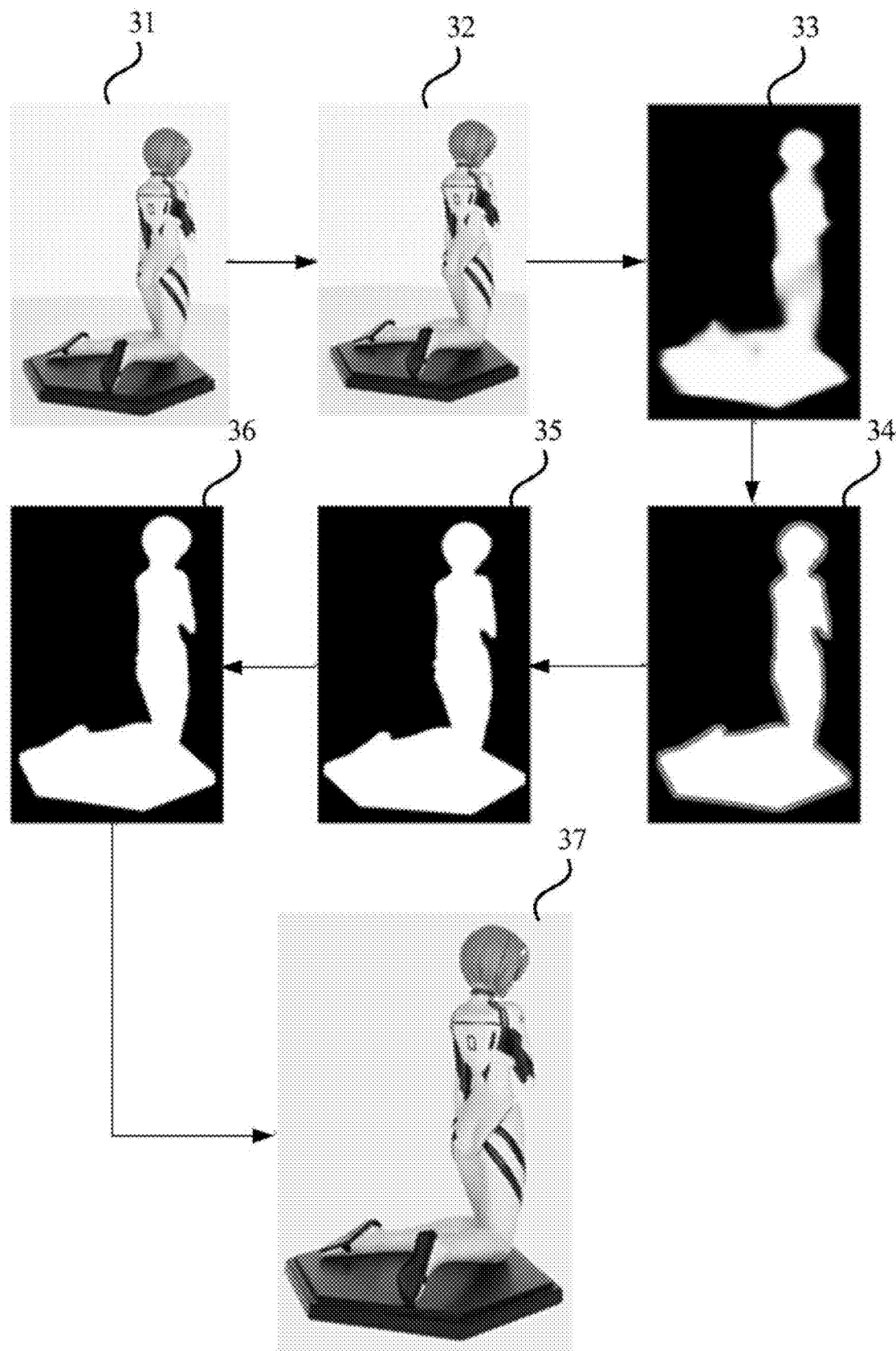
FIG. 3C is an effect diagram of a matting process according to an embodiment of the present disclosure.

Accordingly, taking a corresponding processing flow when the subject proportion is relatively high as an example, an effect diagram as shown in FIG. 3C may be obtained, including: preprocessing an original image 31 to obtain a subject enhanced image 32; performing saliency detection on the subject enhanced image 32 to obtain an initial mask 33, expanding and corroding the binarized initial mask 33 to obtain a tripartite image 34; matting the original image 31 using a preset matting method based on the tripartite image 34 to obtain a precise mask 35 of the original image; and finally, performing edge optimization on the precise mask 35 to obtain a final mask 36 of the original image, then generating a channel data, and synthesizing the final mask and the original image 31 to obtain a background-free image 37.

According to the technical solution of the present embodiment, original images with different subject proportions are matted by different matting approaches, such that high-precision matting effect can be obtained when the subject proportion is low. Further, the present embodiment combines saliency detection with a matting algorithm based on a tripartite image, which further improves the precision of the matting result.

According to an embodiment of the present disclosure, an apparatus for generating a background-free image is further provided.

Figure 4:
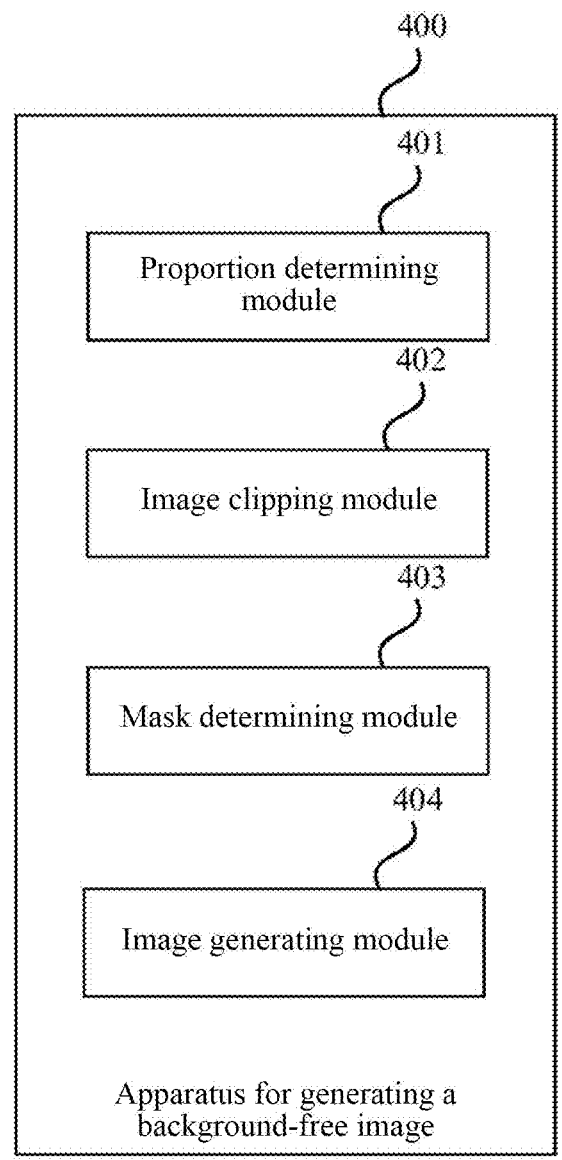
FIG. 4 is a schematic structural diagram of an apparatus for generating a background-free image according to an embodiment of the present disclosure.

FIG. 4 is a schematic structural diagram of an apparatus for generating a background-free image according to an embodiment of the present disclosure. The apparatus may be implemented by software and/or hardware, and may execute the method for generating a background-free image according to any embodiment of the present disclosure. Specifically, the apparatus 400 for generating a background-free image includes: a proportion determining module 401, an image clipping module 402, a mask determining module 403, and an image generating module 404.

The proportion determining module 401 is configured to determine an image proportion of a target subject in an original image.

The image clipping module 402 is configured to clip, in response to the image proportion being less than a preset threshold, a subject region image corresponding to the target subject from the original image.

The mask determining module 403 is configured to determine a corresponding subject region mask based on the subject region image.

The image generating module 404 is configured to synthesize the subject region mask and the subject region image to generate a background-free image corresponding to the original image.

Alternatively, the proportion determining module 401 specifically may include: a first saliency detecting unit configured to perform saliency detection on the original image to obtain an initial mask of the original image; a first binarizing unit configured to binarize the initial mask of the original image to obtain a binarized mask of the original image; and a proportion computing unit configured to compute the image proportion of the target subject in the original image based on an area of a target subject region in the binarized mask of the original image and an area of the original image.

Alternatively, the proportion determining module 401 specifically may further include: a first matting unit configured to, after computing the image proportion of the target subject in the original image based on the area of the target subject region in the binarized mask of the original image and the area of the original image, generate a tripartite image of the binarized mask of the original image in response to the image proportion being more than or equal to the preset threshold, and mat the original image using a preset matting algorithm based on the tripartite image, to obtain a final mask of the original image; and an image synthesizing unit configured to synthesize the final mask of the original image and the original image to generate the background-free image corresponding to the original image.

Alternatively, the image clipping module 402 specifically may include: a matrix determining unit configured to determine a smallest bounding matrix of the target subject based on the binarized mask of the original image; a region enlarging unit configured to enlarge an image region corresponding to the smallest bounding matrix to a preset multiple, for use as an clipped image region; and a subject clipping unit configured to clip a corresponding image block from the original image based on a position of the clipped image region, for use as the subject region image.

Alternatively, the mask determining module 403 specifically may include: a second saliency detecting unit configured to perform saliency detection on the subject region image to obtain an initial mask of the subject region image; a second binarizing unit configured to binarize the initial mask of the subject region image to obtain a binarized mask of the subject region image; and a second matting unit configured to generate the tripartite image based on the binarized mask of the subject region image, and mat the subject region image using the preset matting algorithm based on the tripartite image, to obtain the subject region mask.

Alternatively, the first saliency detecting unit and/or the second saliency detecting unit specifically may include: a model inputting unit configured to input an image into a trained saliency detecting model to output an initial mask of the image.

Alternatively, the first saliency detecting unit and/or the second saliency detecting unit specifically may further include: an image acquiring unit configured to acquire a plurality of background-free subject images and a plurality of preset background images before inputting the image into the trained saliency detecting model; a sample generating unit configured to synthesize any one of the background-free subject images and any one of the preset background images to generate a training sample; and a model training unit configured to train a preset neural network using the training sample to obtain the trained saliency detecting model.

Alternatively, the proportion determining module 401 specifically may further include: an image preprocessing unit configured to enhance and sharpen the original image before performing saliency detection on the original image.

Alternatively, the first matting unit and/or the second matting unit specifically may include: a masking unit configured to expand and corrode the binarized mask to obtain an expanded mask and a corroded mask; a first setting unit configured to set a pixel value of an image region corresponding to a position of the target subject region within the expanded mask in the binarized mask, for use as a first pixel value; a second setting unit configured to set a pixel value of an image region corresponding to a position of the target subject region within the corroded mask in the binarized mask, for use as a second pixel value; a third setting unit configured to set a pixel value of other image regions in the binarized mask for use as a third pixel value, to obtain the tripartite image; and a tripartite image matting unit configured to mat the tripartite image using the preset matting algorithm, to obtain a final mask.

Alternatively, the first matting unit and/or the second matting unit specifically may further include: a smoothing unit configured to perform edge smoothing on a matted mask using a preset filtering approach, after matting the tripartite image using the preset matting algorithm.

The apparatus for generating a background-free image according to embodiments of the present disclosure can execute the method for generating a background-free image according to any embodiment of the present disclosure, and has corresponding function modules for executing the method and beneficial effects.

The embodiments of the present disclosure can improve the matting effect and enhance the matting precision for small target subjects.

According to an embodiment of the present disclosure, the present disclosure further provides an electronic device and a readable storage medium.

Figure 5:
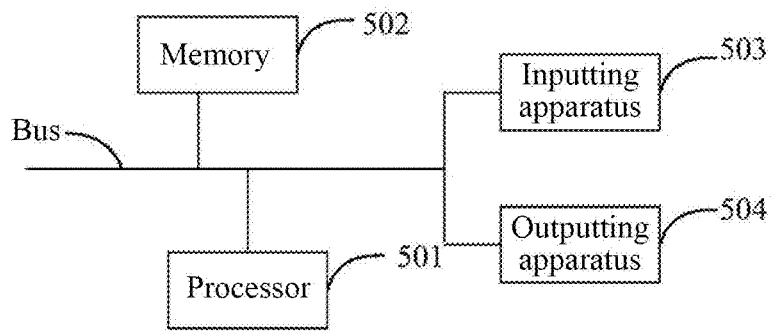
FIG. 5 is a block diagram of an electronic device configured to implement a method for generating a background-free image of embodiments of the present disclosure.

As shown in FIG. 5, which is a block diagram of an electronic device of a method for generating a background-free image according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 5, the electronic device includes: one or more processors 501, a memory 502, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 502 is a non-transitory computer readable storage medium provided by the present disclosure. The memory stores instructions executable by at least one processor, so that the at least one processor performs the method for generating a background-free image provided by the present disclosure. The non-transitory computer readable storage medium of the present disclosure stores computer instructions for causing a computer to perform the method for generating a background-free image provided by the present disclosure.

The memory 502, as a non-transitory computer readable storage medium, may be used to store non-transitory software programs, non-transitory computer executable programs and modules, such as program instructions/modules corresponding to the method for generating a background-free image in the embodiments of the present disclosure (for example, the proportion determining module 401, the image clipping module 402, the mask determining module 403, and the image generating module shown in FIG. 4). The processor 501 executes the non-transitory software programs, instructions, and modules stored in the memory 502 to execute various functional applications and data processing of the server, that is, to implement the method for generating a background-free image in the foregoing method embodiment.

The memory 502 may include a storage program area and a storage data area, where the storage program area may store an operating system and at least one function required application program; and the storage data area may store data created by the use of the electronic device according to the method for generating a background-free image, etc. In addition, the memory 502 may include a high-speed random access memory, and may also include a non-transitory memory, such as at least one magnetic disk storage device, a flash memory device, or other non-transitory solid-state storage devices. In some embodiments, the memory 502 may optionally include memories remotely provided with respect to the processor 501, and these remote memories may be connected to the electronic device of the method for generating a background-free image through a network. Examples of the above network include but are not limited to the Internet, intranet, local area network, mobile communication network, and combinations thereof.

The electronic device of the method for generating a background-free image may further include: an input apparatus 503 and an output apparatus 504. The processor 501, the memory 502, the input apparatus 503, and the output apparatus 504 may be connected through a bus or in other methods. In FIG. 5, connection through a bus is used as an example.

The input apparatus 503 may receive input digital or character information, and generate key signal inputs related to user settings and function control of the electronic device of the method for generating a background-free image, such as touch screen, keypad, mouse, trackpad, touchpad, pointing stick, one or more mouse buttons, trackball, joystick and other input apparatuses. The output apparatus 504 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solutions of embodiments of the present disclosure, in response to determining that an image proportion of a target subject in an original image is less than a preset threshold, a subject region image corresponding to the target subject is clipped from the original image, then a corresponding subject region mask is determined based on the subject region image, and then the subject region mask and the subject region image are synthesized to generate a background-free image corresponding to the original image. The advantage of clipping an image with a low subject proportion and separately matting the image is utilized to solve the problem of existing technologies that when a subject proportion in an original image is low, the matting effect presented by processing a background-free image is undesired and the matting precision is low, and to guarantee high matting precision even for the image with a low subject proportion.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for generating a background-free image, comprising:
   determining an image proportion of a target subject in an original image;
   determining, in response to the image proportion being less than a preset threshold, a smallest bounding matrix of the target subject based on a binarized mask of the original image;
   enlarging an image region corresponding to the smallest bounding matrix to a preset multiple, for use as a clipped image region;
   clipping a corresponding image block from the original image based on a position of the clipped image region, for use as a subject region image;
   determining a corresponding subject region mask based on the subject region image; and
   synthesizing the subject region mask and the subject region image to generate a background-free image corresponding to the original image.

2. The method according to claim 1, wherein the determining an image proportion of a target subject in an original image comprises:
   performing saliency detection on the original image to obtain an initial mask of the original image;
   binarizing the initial mask of the original image to obtain the binarized mask of the original image; and
   computing the image proportion of the target subject in the original image based on an area of a target subject region in the binarized mask of the original image and an area of the original image.

3. The method according to claim 2, wherein after the computing the image proportion of the target subject in the original image based on an area of a target subject region in the binarized mask of the original image and an area of the original image, the method further comprises:
   generating a tripartite image based on the binarized mask of the original image in response to the image proportion being more than or equal to the preset threshold, and matting the original image using a preset matting algorithm based on the tripartite image, to obtain a final mask of the original image; and
   synthesizing the final mask of the original image and the original image to generate the background-free image corresponding to the original image.

4. The method according to claim 3, wherein the generating a tripartite image based on the binarized mask comprises:
   expanding and corroding the binarized mask to obtain an expanded mask and a corroded mask;
   setting a pixel value of an image region corresponding to a position of the target subject region within the expanded mask in the binarized mask, for use as a first pixel value;
   setting a pixel value of an image region corresponding to a position of the target subject region within the corroded mask in the binarized mask, for use as a second pixel value; and
   setting a pixel value of other image regions in the binarized mask for use as a third pixel value, to obtain the tripartite image.

5. The method according to claim 4, wherein after matting the tripartite image using the preset matting algorithm, the method further comprises:
   performing edge smoothing on a matted mask using a preset filtering approach.

6. The method according to claim 2, wherein the performing saliency detection on an image to obtain an initial mask of the image comprises:
   inputting the image into a trained saliency detecting model to output the initial mask of the image.

7. The method according to claim 6, wherein before the inputting the image into a trained saliency detecting model, the method further comprises:
   acquiring a plurality of background-free subject images and a plurality of preset background images;
   synthesizing any one of the background-free subject images and any one of the preset background images to generate a training sample; and
   training a preset neural network using the training sample to obtain the trained saliency detecting model.

8. The method according to claim 2, wherein before the performing saliency detection on the original image, the method further comprises:
   enhancing and sharpening the original image.

9. The method according to claim 1, wherein the determining a corresponding subject region mask based on the subject region image comprises:
   performing saliency detection on the subject region image to obtain an initial mask of the subject region image;
   binarizing the initial mask of the subject region image to obtain a binarized mask of the subject region image; and
   generating a tripartite image based on the binarized mask of the subject region image, and matting the subject region image using a preset matting algorithm based on the tripartite image, to obtain the subject region mask.

10. An electronic device, comprising:
at least one processor; and
a memory communicatively connected to the at least one processor;
wherein the memory stores instructions executable by the at least one processor, and the instructions when executed by the at least one processor, cause the at least one processor to perform operations, comprising:
determining an image proportion of a target subject in an original image;
determining, in response to the image proportion being less than a preset threshold, a smallest bounding matrix of the target subject based on a binarized mask of the original image;
enlarging an image region corresponding to the smallest bounding matrix to a preset multiple, for use as a clipped image region;
clipping a corresponding image block from the original image based on a position of the clipped image region, for use as a subject region image;
determining a corresponding subject region mask based on the subject region image; and
synthesizing the subject region mask and the subject region image to generate a background-free image corresponding to the original image.

11. The electronic device according to claim 10, wherein the determining an image proportion of a target subject in an original image comprises:
performing saliency detection on the original image to obtain an initial mask of the original image;
binarizing the initial mask of the original image to obtain the binarized mask of the original image; and
computing the image proportion of the target subject in the original image based on an area of a target subject region in the binarized mask of the original image and an area of the original image.

12. The electronic device according to claim 11, wherein after the computing the image proportion of the target subject in the original image based on an area of a target subject region in the binarized mask of the original image and an area of the original image, the method further comprises:
generating a tripartite image based on the binarized mask of the original image in response to the image proportion being more than or equal to the preset threshold, and matting the original image using a preset matting algorithm based on the tripartite image, to obtain a final mask of the original image; and
synthesizing the final mask of the original image and the original image to generate the background-free image corresponding to the original image.

13. The electronic device according to claim 12, wherein the generating a tripartite image based on the binarized mask comprises:
expanding and corroding the binarized mask to obtain an expanded mask and a corroded mask;
setting a pixel value of an image region corresponding to a position of the target subject region within the expanded mask in the binarized mask, for use as a first pixel value;
setting a pixel value of an image region corresponding to a position of the target subject region within the corroded mask in the binarized mask, for use as a second pixel value; and
setting a pixel value of other image regions in the binarized mask for use as a third pixel value, to obtain the tripartite image.

14. The electronic device according to claim 11, wherein the performing saliency detection on an image to obtain an initial mask of the image comprises:
inputting the image into a trained saliency detecting model to output the initial mask of the image.

15. The electronic device according to claim 14, wherein before the inputting the image into a trained saliency detecting model, the operations further comprise:
acquiring a plurality of background-free subject images and a plurality of preset background images;
synthesizing any one of the background-free subject images and any one of the preset background images to generate a training sample; and
training a preset neural network using the training sample to obtain the trained saliency detecting model.

16. The electronic device according to claim 11, wherein before the performing saliency detection on the original image, the operations further comprise:
enhancing and sharpening the original image.

17. The electronic device according to claim 10, wherein the determining a corresponding subject region mask based on the subject region image comprises:
performing saliency detection on the subject region image to obtain an initial mask of the subject region image;
binarizing the initial mask of the subject region image to obtain a binarized mask of the subject region image; and
generating a tripartite image based on the binarized mask of the subject region image, and matting the subject region image using a preset matting algorithm based on the tripartite image, to obtain the subject region mask.

18. A non-transitory computer-readable storage medium storing computer instructions, wherein the computer instructions are used to cause a computer to perform operations, comprising:
determining an image proportion of a target subject in an original image;
determining, in response to the image proportion being less than a preset threshold, a smallest bounding matrix of the target subject based on a binarized mask of the original image;
enlarging an image region corresponding to the smallest bounding matrix to a preset multiple, for use as a clipped image region;
clipping a corresponding image block from the original image based on a position of the clipped image region, for use as a subject region image;
determining a corresponding subject region mask based on the subject region image; and
synthesizing the subject region mask and the subject region image to generate a background-free image corresponding to the original image.

* * * * *